United States Patent
Lei et al.

(10) Patent No.: US 7,435,771 B2
(45) Date of Patent: Oct. 14, 2008

(54) STABLE ANTIFOULING PAINT COMPOSITION CONTAINING METAL SALT OF PYRITHIONE AND CUPROUS OXIDE

(75) Inventors: Deqing Lei, Hamden, CT (US); Craig Waldron, Marietta, GA (US); Micheal Davis, New Haven, CT (US)

(73) Assignee: Arch Chemicals, Inc., Norwalk, CT (US)

(*) Notice: Subject to any disclaimer, the term of this patent is extended or adjusted under 35 U.S.C. 154(b) by 326 days.

(21) Appl. No.: 11/286,035

(22) Filed: Nov. 23, 2005

(65) Prior Publication Data

US 2007/0117895 A1 May 24, 2007

(51) Int. Cl.
*C08K 5/36* (2006.01)
(52) U.S. Cl. ........................ 524/287; 524/423; 524/431; 524/493; 524/556
(58) Field of Classification Search .................. 524/287, 524/423, 431, 556
See application file for complete search history.

(56) References Cited

U.S. PATENT DOCUMENTS

| | | | |
|---|---|---|---|
| 4,898,895 A | 2/1990 | Masuoka et al. | |
| 5,080,892 A | 1/1992 | Yamamori et al. | |
| 5,098,473 A | 3/1992 | Hani et al. | |
| 5,112,397 A | 5/1992 | Farmer, Jr. et al. | |
| 5,137,569 A | 8/1992 | Waldron et al. | |
| 5,232,493 A | 8/1993 | Waldron et al. | |
| 5,332,431 A | 7/1994 | Yokoi et al. | |
| 5,342,437 A * | 8/1994 | Gavin et al. | 106/18.33 |
| 6,458,878 B1 * | 10/2002 | Tsuboi et al. | 524/432 |
| 2005/0123503 A1 | 6/2005 | Kozasa et al. | |

FOREIGN PATENT DOCUMENTS

| | | |
|---|---|---|
| EP | 610251 | 8/1994 |
| EP | 1486510 | 12/2004 |
| WO | 1992/015647 | 9/1992 |

OTHER PUBLICATIONS

International Searching Authority, "International Search Report and Written Opinion," sent Jan. 14, 2008 in regards to International Application No. PCT/US06/40961.

* cited by examiner

*Primary Examiner*—Bernard Lipman
(74) *Attorney, Agent, or Firm*—Dale L. Carlson; Wanli Wu; Wiggin and Dana LLP

(57) ABSTRACT

The present invention describes a composition for stabilizing a paint or paint base composition against viscosity change, gelation and agglomeration during formulation and storage. Illustratively, an antifouling paint or paint base composition is disclosed that contains a hydrolysable acrylate resin such as copper acrylate, zinc acrylate, or silyl acrylate, a metal salt of pyrithione, cuprous oxide, and a primary stabilizing agent selected from the group consisting of benzoic acid, hydroxypyridine, metal salts of benzoic acid, and hydroxypyridine, with the proviso that said composition is essentially free of 2-hydroxypyridine N-oxide, and is also essentially free of the sodium, zinc and copper salts of 2-hydroxypyridine-N-oxide.

25 Claims, No Drawings

STABLE ANTIFOULING PAINT COMPOSITION CONTAINING METAL SALT OF PYRITHIONE AND CUPROUS OXIDE

FIELD OF THE INVENTION

This invention relates generally to antifouling paints and paint bases with improved storage stability. More particularly this invention relates to a stable and gel-free antifouling paint and paint base and a process of making the same.

BACKGROUND OF THE INVENTION

The combination of a metal salt of pyrithione and cuprous oxide is known as an excellent biocide composition in antifouling paint formulations. However, paints containing commercial grades of metal salts of pyrithione such as zinc pyrithione and cuprous oxide have been known to thicken, agglomerate or gel during formulation and storage of the paint. Such agglomeration or gelation results in poor storage stability and decreased shelf life of the in-can paint or paint base formulation.

Specifically, it has been noted when certain hydrolysable acrylate resins are present in paint formulations with zinc pyrithione and cuprous oxide, viscosity increases and agglomeration and gelation become problematic during the formulation and storage of the paint. Hydrolysable acrylate resins such copper, zinc and silyl acrylate resins are commonly used in antifouling paint and paint base formulations.

Hydrolysable acrylate resins are known to gradually undergo hydrolysis underwater to form a coating film on a surface as described in U.S. Pat. Nos. 5,080,892; 6,458,878; 5,332,431 and 4,898,895.

The cause and mechanism of the instability problems associated with antifouling paints containing hydrolysable acrylate resins and the combination of zinc pyrithione and cuprous oxide have not been clearly understood. Suggested causes include low quality of zinc pyrithione with high content of impurities and agglomerated particles; low quality of cuprous oxide with higher content of copper metal and copper ions; or chemical reaction of zinc pyrithione with cuprous oxide.

Several patents have disclosed various approaches in an effort to address the gelation problem that exists in paints containing zinc pyrithione in combination with cuprous oxide. For example, U.S. Pat. No. 5,112,397 discloses a process for providing a gelation-inhibited paint, which employs an organic amine or esterified wood rosin in order to impart the desired gelation-inhibition to the paint. However, this process is dependent on ingredients such as polymer resin. Additionally, the organic amines are detrimental from an environmental standpoint.

International Patent Application WO 1992/015647 describes a process for stabilizing zinc pyrithione and cuprous oxide in paint using high purity zinc pyrithione and an amine compound or esterified wood rosin. EP 610251 describes a process for stabilizing paint using 1-20% of a metal salt of rosin. However, the stabilization achieved in both processes is limited. Additionally, hydrolysable acrylate resins are not easily usable in the paints disclosed in these references.

U.S. Pat. Nos. 5,098,473 and 5,137,569 disclose stable compositions that resist gelation. For instance, U.S. Pat. No. 5,098,473 utilizes purified zinc pyrithione to provide gelation-inhibition in paint. U.S. Pat. No. 5,137,569 adds a metal salt of wood rosin wherein the metals salts is selecting from calcium, zinc, copper, iron, nickel, magnesium salts, and their combinations thereof to the paint to provide gellation-inhibition of the paint. However, the storage stability of the coatings disclosed in these references works best at lower or moderate temperatures and therefore would not perform well, or at all, in higher temperature climates.

Recently-published U.S. patent application 2005/123503 discloses a storage stable composition containing a hydrolysable acrylate resin, cuprous oxide, and also a 2-hydroxypyridine-N-oxide stabilizer, or the sodium, zinc or copper salt thereof. However, the storage stability of these pyridine-N-oxide-containing stabilizers in hydrolysable acrylate resin-based paint is less than might be desired.

Accordingly, the storage instability of a paint composition containing a metal salt of pyrithione, cuprous oxide and hydrolysable acrylate resins remains a problem in the art. The present invention is believed to provide one such solution.

SUMMARY OF THE INVENTION

One aspect relates to a hydrolysable acrylate resin-containing paint or paint base that is stabilized against viscosity increase sufficient to cause gelation in the paint or paint base during its formulation and storage. The paint or paint base contains a hydrolysable acrylate resin selected from the group consisting of copper acrylate, zinc acrylate, silyl acrylate, and combinations thereof. The paint or paint base additionally contains a metal salt of pyrithione, cuprous oxide, and a primary stabilizing agent selected from the group consisting of benzoic acid, hydroxypyridine, metal salts of benzoic acid, and metal salts of hydroxypyridine, with the proviso that the composition is essentially free of 2-hydroxypyridine-N-oxide, and is also essentially free of the sodium, zinc and copper salts of 2-hydroxypyridine-N-oxide.

Another aspect relates to a process for preparing a gelation resistant paint or paint base composition containing a hydrolysable acrylate resin, a metal salt of pyrithione and cuprous oxide, wherein the process includes incorporating into the paint or paint base an effective amount of a stabilizing agent selected from the group consisting of benzoic acid, hydroxypyridine, metal salts of benzoic acid, and metal salts of hydroxypyridine in order to prevent or inhibit the formation of gels in the paint or paint base, with the proviso that the composition is essentially free of 2-hydroxypyridine-N-oxide, and is also essentially free of the sodium, zinc and copper salts of 2-hydroxypyridine-N-oxide.

A further aspect relates to a stabilizer composition suitable for providing stability against gelation when incorporated into a hydrolysable resin—containing paint or paint base. The stabilizer cuprous oxide and a stabilizing agent selected from the group consisting of benzoic acid, hydroxypyridine, metal salts of benzoic acid, and metal salts of hydroxypyridine, with the proviso that the stabilizer composition is essentially free of 2-hydroxypyridine-N-oxide, and is also essentially free of the sodium, zinc and copper salts of 2-hydroxypyridine-N-oxide.

Yet another aspect relates to a dispersion of solid particles in a liquid solvent wherein the solid particles are cuprous oxide and a stabilizing agent selected from the group consisting of benzoic acid, hydroxypyridine, metal salts of benzoic acid, and metal salts of hydroxypyridine and where the liquid solvent is water or an organic solvent, with the proviso that the dispersion is essentially free of 2-hydroxypyridine-N-oxide, and is also essentially free of the sodium, zinc and copper salts of 2-hydroxypyridine-N-oxide.

Another aspect relates to a paint or paint base composition that includes a hydrolysable acrylate resin selected from the group consisting of copper acrylate resin, zinc acrylate resin and silyl acrylate resin; a metal salt of pyrithione selected from the group consisting of zinc pyrithione and copper pyrithione; cuprous oxide; and a stabilizing agent selected from the group consisting of benzoic acid and metal salts of benzoic acid.

Still another aspect relates to a dispersion of solid particles in a liquid solvent wherein the solid particles are a metal salt of pyrithione, cuprous oxide and a stabilizing agent selected from the group consisting of benzoic acid, hydroxypyridine, metal salts of benzoic acid, and metal salts of hydroxypyridine and where the liquid solvent is water of an organic solvent, with the proviso that the dispersion is essentially free of 2-hydroxypyridine-N-oxide, and is also essentially free of the sodium, zinc and copper salts of 2-hydroxypyridine-N-oxide.

These and other aspects will become apparent upon reading the following description of the invention.

DETAILED DESCRIPTION OF THE INVENTION

It has now been surprisingly found that the use of a stabilizing agent in accordance with the present invention provides stability against gelation to a paint or paint base composition that contains the stabilizing agent and that also contains a hydrolysable acrylate resin, cuprous oxide, and a metal salt of pyrithione. Such paints and paint bases containing the stabilizing agent exhibit enhanced resistance to gel formation, as compared to paints containing a prior art stabilizer.

Typically, a "paint" composition will contain a resin, a pigment, and various optional additives such as thickening agents, and the like, as is well known in the art. A "paint base" is the portion of a paint formulation, including the polymer resin, into which the pigments are mixed to form a paint. Antifouling paints or paint bases containing a hydrolysable acrylate resin such as copper acrylate resin, zinc acrylate resin or silyl acrylate resin in combination with cuprous oxide and a metal salt of pyrithione have exhibited poor storage stability and have demonstrated commercially unacceptable shelf life. While not wanting to be bound to a specific theory, the inventors of the present invention believe the increased gelation and poor storage stability is a result of cross-linking of molecules of hydrolysable acrylate resins when present in the paint or paint bases. Addition of a stabilizing agent in accordance with the present invention is believed to prevent such cross-linking, and results in a paint or paint base composition that has improved storage stability and decreased gelation.

The hydrolysable resins used in the paint or paint base composition of the present invention are usually manufactured by one of two principal methods. The first method involves direct copolymerization of unsaturated monomers. Specifically, a silyl resin can be synthesized by copolymerization of trialkylsilyl containing monomer with other monomers such as alkylacrylate or methacrylate. The examples of trialkylsilyl containing monomers include trimethylsilyl acrylate, triethylsilylacrylate, tripropylsilylacrylate, tri-isopropylsilylacrylate, tributylsilylacrylate, tri-isobutylsilyl acrylate, tri-hexysilylacrylate, tri-octylsilylacrylate, tri-dodecylsilyl-acrylate, ethyl dimethylsilylacrylate, butyl dimethylsilylacrylate, octyl di-butylsilylacrylate etc., and all these trialkylated methacrylates, and the like.

The second method principally used in the manufacture of hydrolysable resins involves copolymerization of unsaturated monomers in which one of the monomer has a proactive-group followed by thermal transformation of the pro-active group of the resin with other compounds. Copper and zinc acrylate resins can be synthesized by this method. Specifically, copper and zinc acrylate resins can be synthesized by copolymerization of acrylic or methacrylic acid with other unsaturated monomers, such as alkyl acrylate or methacrylate monomers, followed by transformation of acid functional groups to its zinc or copper naphthenate. The examples of acrylic acid are acrylic acid and methacrylaic acid. Other alkyl acrylate are methylacrylate, ethyl acrylate, propyl acrylate, isopropyl acrylate, butyl acrylate, isobutyl acrylate, 2-ethylhexyl acrylate, and all their corresponding alkylated methacrylates, and the like.

Examples of manufacturing the hydrolysable resins are also disclosed in U.S. Pat. Nos. 5,080,892; 6,458,878; 5,332,431; and 4,898,895.

The hydrolysable acrylate resins of the present invention are typically present in a paint or paint base composition between about 10% to about 80% by weight based on the total weight of the paint or paint base composition. Preferably, the hydrolysable acrylate resin is present between about 20% to 70% by weight based on the total weight of the paint or paint base composition.

In addition, the paint and paint base composition of the present invention also contains cuprous oxide and a metal salt of pyrithione. This combination provides biocidal efficacy to the paint or paint bases.

Cuprous oxide is typically present in the paint or paint base composition in an amount between about 20% to about 75% by weight based upon the total weight of the paint or paint base composition. More preferably, cuprous oxide is present in the paint or paint base in an amount between about 25% to 50% by weight based upon the total weight of the paint or paint base composition.

Metal salt of pyrithiones are well known in the art to have biocidal effectiveness in paint or paint bases. Preferred metal salts include zinc and copper. Paint or paint base compositions containing copper acrylate resin in combination with cuprous oxide and copper pyrithione are typically storage stable. However, paint compositions containing copper acrylate resin in combination with cuprous oxide and zinc pyrithione exhibit decreased storage stability and increased gelation. Such observations have allowed the inventors to conclude that paint or paint base compositions containing similar ions have increased storage stability and do not exhibit increased gelation.

Copper pyrithione is available commercially (from Arch Chemicals, Inc., Norwalk, Conn.) in the form of a dry powder.

This form of copper pyrithione may be employed as starting material in the method of the present invention. Alternatively, copper pyrithione may be made by methods known in the art, including those methods disclosed in U.S. Pat. Nos. 5,650,095; 5,540,860; 5,238,490.

Zinc pyrithione may be made by reacting 1-hydroxy-2-pyridinethione (i.e., pyrithione acid) or a soluble salt thereof with a zinc salt (e.g., $ZnSO_4$) to form a zinc pyrithione precipitate, as illustrated by the disclosure of U.S. Pat. No. 2,809,971.

The metal salt of pyrithione is present in the paint or paint base composition in an amount between about 0.5% to about 20% by weight based upon the total weight of the paint or paint base composition. More preferably the metal salt of pyrithione is present in the paint or paint base composition in an amount between about 0.5% to about 10% by weight based upon the total weight of the paint or paint base composition. Most preferably the metal salt of pyrithione is present in the paint or paint base in an amount between about 0.5% to about 5% based upon the total weight of the paint or paint base composition.

Improved storage stability and decreased gelation of paint or paint base compositions containing hydrolysable acrylate resins in combination with cuprous oxide and a metal salt of pyrithione surprisingly occur by the addition of a stabilizing agent.

While not wanting to be bound by any theory, the inventors of the present invention believe the stabilizing agent of the present invention blocks the active cross-linking site(s) of the hydrolysable acrylate resin.

Suitable stabilizing agents for use in accordance with the present invention are benzoic acid, hydroxypyridine, zinc and copper salts of benzoic acid, and metal salts of hydroxypyridine, and a mixture thereof. Preferred stabilizing agents include 2-hydroxypyridine, Zn salt of hydroxypyridine, and zinc benzoate, and mixtures thereof. The paint or paint base composition is typically essentially free of 2-hydroxypyridine-N-oxide, and is also typically essentially free of sodium, zinc, and copper salts of 2-hydroxypyridine-N-oxide. The term "essentially free" as used herein means that less than 100 ppm of 2-hydroxypyridine-N-oxide, and less than 100 ppm of the sodium, zinc, and copper salts of 2-hydroxypyridine-N-oxide are present in the paint or paint base composition. Advantageously, less than 70 ppm of 2-hydroxypyridine-N-oxide and less than 70 ppm of the sodium, zinc, and copper salts of 2-hydroxypyridine-N-oxide are present in the paint or paint base composition. More advantageously, less than 50 ppm of 2-hydroxypyridine-N-oxide and less than 50 ppm of the sodium, zinc, and copper salts of 2-hydroxypyridine-N-oxide are present in the paint or paint base composition. The dispersion contains between about 20% and about 70% by weight of solid particles based on the total weight of the paint or paint base composition.

Preferably, the stabilizing agent is present in the paint or paint base composition of the present invention in an amount between about 0.05% to about 0.8% by weight based on the weight of the paint or paint base composition. In another embodiment, the stabilizing agent is present in the paint or paint base composition in an amount between about 0.15% and about 0.8% by weight based on the weight of the paint or paint base composition.

Preferably the stabilizing agent is soluble in the solvent or mixtures of solvents used in antifouling paint formulations. Solvents include, but are not limited to, water, toluene, xylene, butanol, isobutanol, propanol, isopropanol, propylene glycol methyl ether, propylene glycol butyl ether and mixtures thereof.

Optionally, the paint or paint base composition of the present invention additionally contains a co-stabilizing agent. Co-stabilizing agents of the present invention include dessicants such as alkaline earth metal oxides such as barium oxide and magnesium oxide, sodium sulfate, activated alumia, silica gel, and water-absorbing clays such as natural and synthetic clays. Other organic dessicants, such as dicyclohexyldicarbodimide, are also suitably employed as co-stabilizing agents in accordance with the present invention. Preferred co-stabilizing agents include molecular sieves, activated alumina, sodium sulfate and alkaline earth metal oxides.

The co-stabilizing agent is present in the paint or paint base of the present invention between about 0.25% to about 20% by weight based upon the weight of the paint or paint base. More preferably the co-stabilizing agent is present in an amount between about 0.25% to about 10% by weight based upon the weight of the paint or paint base. In another embodiment, the co-stabilizing agent is present in an amount between about 0.5% to about 5% by weight based upon the weight of the paint or paint base.

The paint or paint base composition of the present invention optionally additionally contains optional additives which have a favorable influence on the viscosity, the wetting power and the dispersibility, as well as on the stability to freezing and electrolytes and on the foaming properties. If a marine paint is being fabricated, the paint preferably contains a swelling agent to cause the paint to gradually "slough off" in its marine environment, thereby causing renewed biocidal efficacy of newly exposed biocide (i.e., the pyrithione salt plus the copper salt) at the surface of the paint in contact with the water medium of the marine environment. Illustrative swelling agents are naturally-occurring or synthetic clays, such as kaolin, montomorillonite (bentonite), clay mica (muscovite), and chlorite (hectonite), and the like. In addition to clays, other swelling agents, including natural or synthetic polymers, such as that commercially available as POLYMERGEL, have been found to be useful in the compositions of the present invention to provide the desired "sloughing off" effect. Swelling agents can be used singly or in combination. The total amount of optional additives is preferably no greater than 20% by weight, more preferably between about 1% and about 5% by weight, based upon the total weight of the paint composition.

Illustrative thickening agents include cellulose derivatives, for example methyl, hydroxyethyl, hydroxypropyl and carboxymethyl cellulose, poly(vinyl alcohol), poly (vinylpyrolidone), poly(ethylene-glycol), salts of poly(acrylic acid) and salts of acrylic acid/acrylamide copolymers.

Suitable wetting and dispersing agents include sodium polyphosphate, salts of low-molecular-weight poly(acrylic acid), salts of poly(ethane-sulfonic acid), salts of poly (vinylphosphonic acid), salts of poly(maleic acid) and salts of copolymers of maleic acid with ethylene, 1-olefins with 3 to 18 carbon atoms and/or styrene.

The paint of the present invention may be used as a paint for natural or synthetic materials, for example wood, paper, metals, textiles and plastics. It is particularly suitable as an outdoor paint, and is excellent for use as a marine paint.

The paint or paint base composition containing a hydrolysable acrylate resin in combination with cuprous oxide and a metal salt of pyrithione and a stabilizing agent can be manufactured by processes and methods known to those of skill in the relevant art.

Increased storage stability of a paint or paint base composition may be accomplished by the addition of a stabilizer composition that includes cuprous oxide and a stabilizing agent. Typically, this composition is in the form of a powder and can be added directly to the paint or paint base composition. Preferably, the stabilizing agent is present in a stabilizer composition in an amount between about 0.01% and about 5% by weight based upon the weight of the cuprous oxide. In another embodiment, the stabilizing agent is present in the stabilizer composition in an amount between about 0.03% and about 4% by weight, based on the weight of the cuprous oxide. In another embodiment, the stabilizing agent is present in the stabilizer composition in an amount between about 0.02% and about 3% by weight, based on the weight of the cuprous oxide.

Alternatively, the stabilizer composition of the present invention may be put into a dispersion with a solvent. The solvent may be water, xylene, toluene, butanol, or any organic solvent suitable for the dispersion of the present invention. The dispersion may be mixed directly with a paint or paint base composition.

Alternatively, the stabilizing agent of the present invention may be introduced to a paint or paint base through a composition that includes a metal salt of pyrithione and the stabilizing agent dispersed in a solvent. Alternatively, a dispersion containing solid particles of a metal salt of pyrithione and the stabilizing agent may be introduced into a paint or paint base composition to increase stability and decrease gelation. The dispersion is essentially free of 2-hydroxypyridine-N-oxide and is also essentially free of sodium, zinc, and copper salts of 2-hydroxypyridine-N-oxide. The term "essentially free" as used herein means less than 100 ppm of 2-hydroxypyridine-N-oxide and less than 100 ppm of the sodium, zinc, and copper salts of 2-hydroxypyridine-N-oxide are present in the dispersion. Advantageously, less than 70 ppm of 2-hydroxypyridine-N-oxide and less than 70 ppm of the sodium, zinc, and copper salts of 2-hydroxypyridine-N-oxide are present in the dispersion. More advantageously, less than 50 ppm of 2-hydroxypyridine-N-oxide and less than 50 ppm of the sodium, zinc, and copper salts of 2-hydroxypyridine-N-oxide are present in the dispersion. The dispersion contains between about 20% and about 70% by weight of solid particles based on the total weight of the dispersion.

The following examples of the present invention further describe and demonstrate the preferred embodiments within the scope of the present invention. The examples are given solely for the purpose of illustration, and are not to be understood as limitations of the present invention since many variations therefore are possible within the scope. In addition, unless it is specifically defined "parts" and "%" are weight standards.

EXAMPLE 1

Part A—Production of a Copper Acrylate Resin (Resin A)

To produce a hydrolysable copper acrylate resin for use in the embodiments of the present invention 1100 parts of xylene and 250 parts of n-butanol were placed into a four-necked flask. The four-necked flask was equipped with a mechanic stirrer, a reflux condenser, a dropping funnel, and a temperature probe with a controller. The mixture was stirred and heated to 110-120° C., and maintained at that temperature.

A mixture of 600 parts of ethyl acrylate, 250 parts of 2-ethylbexyl acrylate, 72 parts of acrylic acid and 25 parts of azobisisobutyronitrile were added drop wise to the mixture in the four-necked flask at a constant rate over 3 hours. After the addition was completed, the mixture was continued to be stirred at same temperature for 2 hours. The resulting varnish had a solid content of 39.8% and an acceptable viscosity.

To the varnish, 259 parts of naphthenic acid (acid value 216 KOH mg/g) and 98 parts of copper hydroxide were added. The mixture was stirred and heated to 120° C., and maintained at the same temperature for 2 hours. During this period of time, the generated water was removed from the mixture through the decanter until no water was generated. The generated resin had a green color, a solid content of 51%, and viscosity of 2.2 poise. (This resin hereinafter referred to as Resin A).

To determine the copper content of Resin A, the resin sample was precipitated with spirits. The copper content in the resin was 6.8% wt.

Part B—Production of a Copper Acrylate Resin (Resin B)

To produce a copper acrylate resin, 500 parts of xylene, and 100 parts of butanol were added into a four-necked flask. The four-necked flask was equipped with a condenser, a stirrer, a nitrogen purge, and a dropping funnel. The mixture was stirred and heated to 100-110° C., and maintained at that temperature. 38.5 parts of methacrylic acid, 322 parts of methyl methacrylate, 140 parts of 2-ethylhexylmethacrylate and 10 parts of azoisobutyronitrile were added drop-wise at a constant rate to the mixture in the four-necked flask in 4 hours. After the drop-wise addition to the mixture was completed, it was stirred at 110° C. for 30 minutes.

A mixed solution of 100 parts of xylene, and 50 parts of butanol, and 5 parts of azobis-isobutyronitrile were added drop-wise to the mixture in the four-necked flask over a one hour timespan. The resulting mixture was stirred at the same temperature for 2 hours after the completion of the dropwise addition. The solid part of the obtained resin solution (varnish A) was 9.8 weight %, the solid part acid value was 50 mgKOH/g.

800 parts of the varnish made above, 93.8 parts of proplonic acid copper, 116 parts of naphthenic acid (acid value 216 KOH mg/g), and 80 parts of de-ionized water were added to a four-necked flask equipped with the condenser, the stirrer, the nitrogen purge, and the decanter. This mixture was stirred and heated to 100° C and the propionic acid generated along with water as a reaction advanced were removed.

The terminal point of a reaction was determined by the fixed quantity of the propionic acid (41 parts) in an outflow solvent (quantitative analysis for propionic acid) then removed the water in a system completely, finished the reaction, and added the xylene that was out-flowed. Resin (B) contained the amount of solid 52.3 weight %.

Part C—Preparation and Testing of Paints With and Without Stabilizers

The paint formulations in Table 4 below illustrate formulations of antifouling paints employing a stabilizing agent in accordance with the present invention incorporated into Paints 3 through 6. The paints were prepared as follows:

The below amount of Cu acrylate resin A (Table 1) was added to a ½ pint paint can along with 0.5 g wax. This was mixed at a low speed while the below stabilizing agent, cuprous oxide and zinc pyrithione, was added to the paint. The mixing speed was increased using the high speed disperser to 3000 rpm for 20 minutes. Once the paint was complete the Hegman gauge test was used to measure particle size of pigments and paint thickness was checked. All the paints were stored in an oven at 40° C. and the paints were tested periodically according to the Hegman gauge test (described in more detail below).

Paint formulation of Paint 7 contains the zinc salt of 2-hydroxypyridine-N-oxide as a stabilizing agent which is a stabilizing agent disclosed in published U.S. patent application 2005/123503. The use level is the same as that employed in the working examples of this published patent application.

Paint 8 is a control example containing no stabilizing agent. Table 4 illustrates the improvement of paint stabilization that is achieved when a stabilizing agent of the present invention is added to the paint formulation.

TABLE 1

Examples of Paints containing a stabilizing additive (Paints 3-6) versus a Comparative Example (Paint 7) and a Control Example (Paint 8)

|  | Paint 3 | Paint 4 | Paint 5 | Paint 6 | (comparative example) Paint 7 | (Control Example) Paint 8 |
|---|---|---|---|---|---|---|
| Ingredients |  |  |  |  |  |  |
| 2-HydroxyPyridine | 0.15 | — | — | — | — | — |
| Zn-Salt-HydroxyPyridine | — | 0.15 | — | — | — | — |
| Zn-Salt Benzoic Acid | — | — | 0.15 | — | — | — |
| Resorcinol MonoBenzoate | — | — | — | 0.15 | — | — |
| Zn salt of 2-hydroxypyridine N-oxide | — | — | — | — | 0.15 | — |
| No Additive-Control | — | — | — | — | — | 0 |
| Cu acrylate Resin A | 61.35 | 61.35 | 61.35 | 61.35 | 61.35 | 61.45 |
| Cuprous Oxide | 35 | 35 | 35 | 35 | 35 | 35.05 |
| Zinc Pyrithione | 3 | 3 | 3 | 3 | 3 | 3 |
| Wax | 0.5 | 0.5 | 0.5 | 0.5 | 0.5 | 0.5 |
| Total % | 100 | 100 | 100 | 100 | 100 | 100 |
| Results Hegman |  |  |  |  |  |  |
| Initial Score | 3 | 3 | 3 | 3 | 3 | 3 |
| 1 day @ 40 C. | 3 | 3 | 3 | 3 | 3 | 3 |
| 4 days @ 40° C. | 2 | 3 | 3 | 1 | 2 | 0 |
| 1 week @ 40° C. | 2 | 3 | 3 | 1 | 1 | 0 |
| 2 weeks @ 40° C. | 2 | 3 | 3 | 1 | 0 | 0 |
| 3 weeks @ 40° C. | 2 | 3 | 3 | 1 | 0 | 0 |
| 4 weeks @ 40° C. | 2 | 3 | 3 | 1 | 0 | 0 |
| 5 weeks @ 40° C. | — | 3 | 3 | — | — | — |
| 6 weeks @ 40° C. | — | 3 | 3 | — | — | — |
| Final viscosity Results | good | good | good | thick | gelled | gelled |

To measure the stability and gelation of the antifouling paints, *ASTM Method D1210-79, Standard Test Method for Fineness of Dispersion of Pigment—Vehicle Systems* (hereinafter referred to as "Hegman test" or "Hegman gauge") was used. The Hegman test measures the degree of dispersion of a pigment in a pigment-vehicle system such as a paint, paint base, or other liquid coating. This test is also used to assess the agglomeration of particles, if any, in the paint being tested. Most importantly, this test is also used to rate the stability of paints, paint bases or liquid coatings against gelation during in-can storage under "accelerated aging" conditions at 40° C.

The paint formulations of this example illustrate the effectiveness of employing a stabilizing agent from the group of: 2-hydroxypyridine, a zinc salt of hydroxypyridine, and a zinc-salt of benzoic acid, in accordance with the present invention to stabilize a paint formulation containing zinc pyrithione, cuprous oxide and a copper acrylate resin. It was noted that the Hegman gauge readings for the formulations of the present invention, namely Paints 3 through 6. did not change during 6 weeks of storage. Contrariwise, the Hegman gauge readings for the Comparative Example, namely Paint 7, decreased from 3 to 0 in just 2 weeks. The Hegman gauge reading for the control example, namely Paint 8, decreased to 0 in just four days. Accordingly, paint formulations of the present invention have increased storage stability as compared to the Control and Comparative Examples' paints.

COMPARATIVE EXAMPLE A

Example of Hydrolysable Zinc Acrylate Resin

A zinc acrylate type resin was produced using a method of synthesis similar to the synthesis of Resin B. The solids content of this resin in solvent was approximately 50%.

TABLE 2

Paint 8 - Formulation of antifouling paint using zinc acrylate resin.

| Ingredient | Weight % |
| --- | --- |
| Zinc acrylate resin (50%) in solvent (from above) | 60 |
| Cuprous oxide | 36 |
| Zinc pyrithione | 3 |
| Wax (Thixotrope) | 1 |

The formulation of Paint 8 was of suitable viscosity for application by brush or roller immediately after preparation, but thickened to an unpourable paste after approximately 24 hours.

EXAMPLE 2

TABLE 3

Paint 9 - Paint formulation containing a zinc acrylate resin and a primary stabilizing agent.

| Ingredient | Weight % |
| --- | --- |
| Zinc acrylate resin (50%) in solvent (from above) | 60 |
| Cuprous oxide | 36 |
| Zinc pyrithione | 3 |
| Zinc salt of Benzoic acid | 0.3 |
| Wax (Thixotrope) | 1 |

Paint 9 was formulated with a zinc acrylate resin as described in Comparative Example B. Paint 9 was observed to be stable for at least 6 weeks and continuing at 23° C. and also at 40° C. This paint had a suitable viscosity to application by brush or roller.

This example illustrates the effectiveness of employing a stabilizing agent in accordance with the present invention to stabilize a paint formulation containing zinc pyrithione, cuprous oxide and a zinc acrylate resin. The Hegman gauge reading on particle size had not changed in the 6 weeks of storage. Accordingly, the paint formulation of the present example had increased storage stability and did not exhibit gelation.

EXAMPLE 3

TABLE 4

Paint 11 - Paint formulation with a zinc acrylate resin, copper pyrithione, a stabilizing agent and a co-stabilizing agent.

| Ingredient | Weight % |
| --- | --- |
| Zinc acrylate resin C (50%) in solvent (from above) | 60 |
| Cuprous oxide | 35.6 |
| Copper pyrithione | 3 |
| Molecular Sieves powder[1] | 1.0 |
| Copper salt of Benzoic acid | 0.4 |

[1]Product of Miles Inc.

AF Paint 11 was observed to be stable for at least 3 months at 23° C. and also at 60° C. This paint had a suitable viscosity to application by brush or roller.

The above example illustrates the effectiveness of employing a stabilizer additive, such as molecular sieves, in accordance with the present invention to stabilize a paint formulation containing copper pyrithione, cuprous oxide and a zinc acrylate resin. The Hegman gauge reading on particle size did not change in the 3 months of storage. Accordingly, the paint formulation of the present example have increased storage stability and does not exhibit gelation.

While the invention has been described above with references to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

What is claimed is:

1. A paint or paint base composition comprising: a hydrolysable acrylate resin selected from the group consisting of copper acrylate resin, zinc acrylate resin, silyl acrylate resin, and combinations thereof; a metal salt of pyrithione selected from the group consisting of zinc pyrithione and copper pyrithione; cuprous oxide; and a stabilizing agent selected from the group consisting of hydroxypyridine, metal salts of benzoic acid, metal salts of hydroxypyridine, and a mixture thereof, with the proviso that said composition is essentially free of 2-hydroxypyridine-N-oxide, and is also essentially free of sodium, zinc and copper salts of 2-hydroxypyridine-N-oxide.

2. The paint or paint base composition of claim 1 further comprising a co-stabilizing agent selected from the group consisting of alkaline earth metal oxides, sodium sulfate, activated alumina, silica gel, water-absorbing clays, dicyclohexyldicarbodiimide, and molecular sieves.

3. The paint or paint base composition of claim 2 wherein said co-stabilizing agent is present in said paint or paint base composition in an amount between 0.25% and 20% by weight based on the total weight of the paint or paint base composition.

4. The paint or paint base composition of claim 1 wherein said hydrolysable acrylate resin is present in said paint or paint base composition in an amount between about 10% and about 80% by weight based on the total weight of the paint or paint base composition.

5. The paint or paint base composition of claim 4 wherein said hydrolysable acrylate resin is present in said paint or paint base composition in an amount between about 20% and about 70% by weight based on the total weight of the paint or paint base composition.

6. The paint or paint base composition of claim 1 wherein said metal salt of pyrithione is present in said paint or paint base composition in an amount between about 0.5% and about 20% by weight based on the total weight of the paint or paint base composition.

7. The paint or paint base composition of claim 6 wherein said metal salt of pyrithione is present in said paint or paint base composition in an amount between about 0.5% and about 10% by weight based on the total weight of the paint or paint base composition.

8. The paint or paint base composition of claim 1 wherein said cuprous oxide is present in said paint or paint base composition in an amount between about 20% and about 75% by weight based on the total weight of the paint or paint base composition.

9. The paint or paint base composition of claim 1 wherein said stabilizing agent is present in said paint or paint base composition in an amount between about 0.05% and about 0.8% by weight based on the total weight of the paint or paint base composition.

10. The paint or paint base composition of claim 9 wherein said stabilizing agent is present in said paint base composition in an amount between about 0.15% and about 0.8% by weight based on the total weight of the paint base composition.

11. A paint or paint base composition comprising: a hydrolysable acrylate resin selected from the group consisting of copper acrylate resin, zinc acrylate resin, silyl acrylate resin, and combinations thereof; a metal salt of pyrithione selected from the group consisting of zinc pyrithione and copper pyrithione; cuprous oxide; and a stabilizing agent selected from group consisting of Zn salt of hydroxypyridine, zinc benzoate, 2-hydroxypyridine, or a mixture thereof.

12. A process for preparing a gelation resistant paint or paint base composition containing a hydrolysable acrylate resin, a metal salt of pyrithione and cuprous oxide, wherein the process comprises incorporating into the paint or paint base an effective amount of a stabilizing agent or a mixture of stabilizing agents selected from the group consisting of hydroxypyridine, metal salts of benzoic acid, and metal salts of hydroxypyridine in order to prevent or inhibit the formation of gels in said paint or paint base, with the proviso that said paint or paint base composition is essentially free of 2-hydroxypyridine N-oxide, and is also essentially free of sodium, zinc and copper salts of 2-hydroxypyridine-N-oxide.

13. A process for preparing a gelation resistant paint or paint base composition containing a hydrolysable acrylate resin, a metal salt of pyrithione and cuprous oxide, wherein the process comprises incorporating into the paint or paint base an effective amount of a stabilizing agent selected from the group consisting of Zn salt of 2-hydroxypyridine, zinc benzoate, 2-hydroxypyridine or a mixture thereof in order to prevent or inhibit the formation of gels in said paint or paint base, with the proviso that said paint or paint base composition is essentially free of 2-hydroxypyridine N-oxide, and is also essentially free of sodium, zinc and copper salts of 2-hydroxypyridine-N-oxide.

14. The process of claim 12 wherein said effective amount of said stabilizing agent or mixture of stabilizing agents is between about 0.05% and about 0.8% by weight based on the total weight of the paint or paint base composition.

15. The process of claim 14 wherein said effective amount of said stabilizing agent is about 0.15% and about 0.8% by weight based on the total weight of the paint or paint base composition.

16. The process of claim 12 further comprising: adding an effective amount of a co-stabilizing agent to said paint or paint base composition.

17. The process of claim 16 wherein said effective amount of said co-stabilizing agent is between about 0.25% and 20% by weight based on the total weight of the paint or paint base composition.

18. A stabilizer composition comprising: cuprous oxide; and a stabilizing agent selected from the group consisting of hydroxypyridine, metal salts of benzoic acid, metal salts of hydroxypyridine, and a mixture thereof, with the proviso that the stabilizer composition is essentially free of 2-hydroxypyridine-N-oxide, and is also essentially free of the sodium, zinc and copper salts of 2-hydroxypyridine-N-oxide.

19. A stabilizer composition comprising: cuprous oxide; and a stabilizing agent selected from the group consisting of zinc salt of hydroxypyridine, zinc benzoate, 2-hydroxypyridine, or a mixture thereof, with the proviso that the stabilizer composition is essentially free of 2-hydroxypyridine-N-oxide, and is also essentially free of the sodium, zinc and copper salts of 2-hydroxypyridine-N-oxide.

20. The stabilizer composition of claim 18 wherein said stabilizing agent is between about 0.02% and about 3% by weight based on the weight of the cuprous oxide in said composition.

21. A stabilizer composition comprising: cuprous oxide; and a stabilizing agent selected from the group consisting of hydroxypyridine, metal salts of benzoic acid, metal salts of hydroxypyridine, and a mixture thereof, with the proviso that the stabilizer composition is essentially free of 2-hydroxypyridine-N-oxide, and is also essentially free of the sodium, zinc and copper salts of 2-hydroxypyridine-N-oxide, wherein said mixture of stabilizing agents is between about 0.03% and about 4% by weight based on the weight of the cuprous oxide in said composition.

22. A paint or paint base composition comprising: a hydrolysable acrylate resin selected from the group consisting of copper acrylate resin, zinc acrylate resin and silyl acrylate resin; a metal salt of pyrithione selected from the group consisting of zinc pyrithione and copper pyrithione; cuprous oxide; and a stabilizing agent, wherein said stabilizing agent is a metal salt of benzoic acid.

23. A dispersion of solid particles in a liquid solvent wherein said solid particles comprise cuprous oxide and a stabilizing agent selected from the group consisting of hydroxypyridine, metal salts of benzoic acid and metal salts of hydroxypyridine and further wherein said liquid solvent is water or an organic solvent, with the proviso that said dispersion is essentially free of 2-hydroxypyridine N-oxide, and is also essentially free of the sodium, zinc and copper salts of 2-hydroxypyridine-N-oxide.

24. The dispersion of claim 23 wherein said solid particles are present in said dispersion in an amount between about 20% and about 70% by weight based on the total weight of the dispersion.

25. A dispersion of solid particles in a liquid solvent wherein said solid particles comprise a metal salt of pyrithione and a stabilizing agent selected from the group consisting of 2-hydroxypyridine, metal salts of benzoic acid, and metal salts of hydroxypyridine and further wherein said liquid solvent is water or an organic solvent, with the proviso that said composition is essentially free of 2-hydroxypyridine N-oxide, and is also essentially free of sodium, zinc and copper salts of 2-hydroxypyridine-N-oxide.

* * * * *